United States Patent
Wang et al.

(10) Patent No.: US 9,709,747 B2
(45) Date of Patent: Jul. 18, 2017

(54) DIGITAL DISPERSION COMPENSATION MODULE

(71) Applicants: Tongqing Wang, Newark, CA (US); Dobby Lam, Dublin, CA (US); Jinghui Li, Sierra Madre, CA (US)

(72) Inventors: Tongqing Wang, Newark, CA (US); Dobby Lam, Dublin, CA (US); Jinghui Li, Sierra Madre, CA (US)

( * ) Notice: Subject to any disclaimer, the term of this patent is extended or adjusted under 35 U.S.C. 154(b) by 0 days.

(21) Appl. No.: 15/368,489

(22) Filed: Dec. 2, 2016

(65) Prior Publication Data

US 2017/0082804 A1   Mar. 23, 2017

Related U.S. Application Data

(63) Continuation of application No. 14/120,689, filed on Jun. 17, 2014.

(Continued)

(51) Int. Cl.
G02B 6/26 (2006.01)
G02B 6/42 (2006.01)
(Continued)

(52) U.S. Cl.
CPC ..... *G02B 6/29392* (2013.01); *G02B 6/02076* (2013.01); *G02B 6/268* (2013.01); *G02B 6/29317* (2013.01); *G02B 6/356* (2013.01); *H04B 10/07951* (2013.01); *H04B 10/2519* (2013.01); *H04B 10/25133* (2013.01); *H04L 45/22* (2013.01); *H04Q 11/0005* (2013.01); *H04Q 11/0066* (2013.01); *H04Q 2011/0022* (2013.01); *H04Q 2011/0081* (2013.01); *H04Q 2011/0083* (2013.01)

(58) Field of Classification Search
CPC .... G02B 6/268; G02B 6/02076; G02B 6/356; H04B 10/07951; H04B 10/2519; H04L 45/22; H04Q 11/0005; H04Q 11/0066
USPC ...................................................... 385/21, 22
See application file for complete search history.

(56) References Cited

U.S. PATENT DOCUMENTS 5,602,666 A    2/1997  Ishikawa et al.
2002/0159672 A1*  10/2002  Fells .................... G02B 6/2932
                                                          385/13

(Continued)

OTHER PUBLICATIONS

Office Action of Jan. 20, 2017 of U.S. Appl. No. 14/120,698.
Office Action of Jul. 20, 2016 of U.S. Appl. No. 14/120,698.

*Primary Examiner* — Jerry Blevins

(57) ABSTRACT

Embodiments of present invention provide a digital dispersion compensation module. The digital dispersion compensation module includes a multi-port optical circulator; and a plurality of dispersion compensation units connected to the multi-port optical circulator, wherein at least one of the plurality of dispersion compensation units includes a fiber-bragg grating (FBG) having a first port and a second port; and an optical switch being capable of selectively connecting to one of the first port and the second port of the FBG, wherein the at least one of the plurality of dispersion compensation units is adapted to provide a positive dispersion to an optical signal, from the multi-port optical circulator, when the optical switch connects to the first port of the FBG and is adapted to provide a negative dispersion to the optical signal when the optical switch connects to the second port of the FBG.

16 Claims, 5 Drawing Sheets

Related U.S. Application Data

(60) Provisional application No. 61/957,352, filed on Jul. 1, 2013.

(51) Int. Cl.

| | | |
|---|---|---|
| *G02B 6/293* | (2006.01) | |
| *G02B 6/35* | (2006.01) | |
| *G02B 6/02* | (2006.01) | |
| *H04B 10/079* | (2013.01) | |
| *H04B 10/2519* | (2013.01) | |
| *H04L 12/707* | (2013.01) | |
| *H04Q 11/00* | (2006.01) | |
| *H04B 10/2513* | (2013.01) | |

(56) References Cited

U.S. PATENT DOCUMENTS

| | | |
|---|---|---|
| 2003/0128920 A1 | 7/2003 | Way |
| 2005/0220409 A1* | 10/2005 | Guerin .................. G02B 6/022 385/37 |
| 2011/0052198 A1 | 3/2011 | Ohtani |
| 2011/0205531 A1 | 8/2011 | Ohtani |
| 2015/0043917 A1 | 2/2015 | Simonneau et al. |

* cited by examiner

DIGITAL DISPERSION COMPENSATION MODULE

CROSS REFERENCE TO RELATED APPLICATION

This is a continuation application of U.S. patent application Ser. No. 14/120,689 entitled "Digital dispersion compensation module", filed Jun. 17, 2014, which claims benefit of priority to a provisional U.S. patent application Ser. No. 61/957,352, filed Jul. 1, 2013.

FIELD OF THE INVENTION

The present invention relates generally to configuration and structure of devices for optical signal transmission and transportation and, in particular, relates to a digital dispersion compensation module.

BACKGROUND

Optical signal transmission and transportation is a key enabling force in today's high speed digital communication infrastructure which supports vast amount of data transportation that are essential for many data centric informational applications such as, for example, internet application. With ever increasing demand for transportation bandwidth, new optical signal transmission and transportation systems are constantly being developed which trend toward higher data rate and higher channel density count.

Optical signal, in a format of binary or multi digital level, usually experiences certain amount of distortion during transportation that, together with other causes such as noise, affects overall system performance. Generally, the higher the data rate of and the longer a distance traveled by an optical signal, the bigger the amount of distortion that the optical signal usually experiences. Among many factors contributing to the optical signal distortion, chromatic dispersion of the transportation media such as fiber is a main factor. The amount of dispersion that an optical signal is able to tolerate in a transmission system varies inversely proportional to the square of the data-rate. As a general rule of thumb, for a 40 Gb/s direct detection system, the dispersion window is typically less than the equivalent of 10 km of SMF-28 fiber at 1550 nm wavelength.

FIG. 1 is a simplified functional block diagram of an optical signal transportation system with line protection scheme as is known in the art. Under normal working conditions, optical signals are usually transported over working fiber paths 31 and 32, as a bidirectional optical transportation system 1, between terminal 10 and terminal 20. If there is a fault such as fiber cut in one or both of the working fiber paths 31 and 32, the amount of optical signal received at photo-detector PD2 in terminal 10 and/or at photo-detector PD5 in terminal 20 will generally decrease to a level below a pre-defined threshold. As a result, this decrease in signal level triggers optical line protection (OLP) switches, such as SW1 and SW2 in terminal 10 and SW3 and SW4 in terminal 20, to switch and cause the system to transmit and receive optical signals via protection fiber paths 41 and 42 instead of working fiber paths 31 and 32. The same event, such as fiber cut, may also generate a system alarm to alert the happening and existence of such a fault in the working fiber paths 31 and 32. Optical signals transported over protection fiber paths 41 and 42 may continue to be monitored by photo-detectors PD3 and PD6. In the bidirectional transportation system 1 of FIG. 1, photo-detectors PD1 and PD4 are used to monitor the optical signal levels launched into the fibers, in both directions.

However, the above optical system configuration may not work well on fiber links with a narrow dispersion window due to difference in total fiber dispersion between the working fiber paths 31/32 and the protection fiber paths 41/42. This is especially true in a DQPSK system where data rate of the optical signal is high around 40 Gb/s or higher. Generally, in the above system in order to expand dispersion window such that an optical signal may be able to tolerate, fiber-bragg gratings (FBG) and more frequently Etalon-based channelized tunable dispersion compensation modules (TDCM), both of which are not shown in FIG. 1, are used at the receiving end of each channels of their respective terminals.

In order to get the optical transmission system back to work or be recovered, the tunable dispersion compensation module (TDCM) in each receiving channel is required to change or modify their dispersion setting so as to compensate any difference in the amount of dispersion between the working and the protection fiber paths. However, dispersion of this channelized TDCM is normally tuned through gradual temperature change which is usually considered as slow in the range of seconds, if not in the tens of seconds. Together with the process of using forward error correction (FEC) feedback or other feedback mechanism to find the right setting for the TDCM, the entire process of recovering the transmission system from fiber cut, for example, for just one channel may take several seconds and sometimes close to tens of seconds. It is known in the industry that for dynamic line protection application it is generally required that the system recovery time must be less than 50 ms. Obviously, the thermally-tuned TDCM is unable to meet the 50 ms recovery time requirements for the protection scheme of an optical transport system.

SUMMARY

Embodiments of present invention provide a digital dispersion compensation module and configuration thereof. The digital dispersion compensation module (DDCM) includes a multi-port optical circulator; and a plurality of dispersion compensation units connected to the multi-port optical circulator, wherein at least one of the plurality of dispersion compensation units includes a fiber-bragg grating (FBG) having a first port and a second port; and an optical switch being capable of selectively connecting to one of the first port and the second port of the FBG, wherein the at least one of the plurality of dispersion compensation units is adapted to provide a positive dispersion to an optical signal, from the multi-port optical circulator, when the optical switch connects to the first port of the FBG and is adapted to provide a negative dispersion to the optical signal when the optical switch connects to the second port of the FBG.

In one embodiment, each of the plurality of dispersion compensation units is configurable to selectively provide a positive dispersion or a negative dispersion to the optical signal, with value of the negative dispersion being the same as value of the positive dispersion.

In another embodiment, value of the positive and negative dispersion provided by each of the plurality of dispersion compensation units is different.

In a further embodiment, value of the positive and negative dispersion provided by each of the plurality of dispersion compensation units, except a minimum one among the plurality of dispersion compensation units, is twice of value of the positive and negative dispersion of another dispersion compensation unit of the plurality of dispersion compensation units.

According to one embodiment, at least one of the plurality of dispersion compensation units is a transmission-type dispersion compensation unit having a first port and a second port, with one of the first port and the second port of the transmission-type dispersion compensation unit being an input port or an output port of the DDCM.

According to another embodiment, at least one of the plurality of dispersion compensation units is a reflective-type dispersion compensation unit having a positive dispersion element, a negative dispersion element, and an optical switch being configurable to selectively connect to either the positive or the negative dispersion element, the positive and negative dispersion element being dispersion fibers with both reflectively terminated at one end thereof.

In one embodiment, the FBG is capable of selectively providing the positive or the negative dispersion to the optical signal over a continuous bandwidth of at least 35 nm in either a C-band of 1530-1565 nm or a L-band of 1565-1625 nm of optical signal spectrum.

In another embodiment, the FBG is adapted to provide a non-zero second-order dispersion value to the optical signal, with the second-order dispersion being a derivative of the positive dispersion or the negative dispersion.

BRIEF DESCRIPTION OF THE DRAWINGS

The present invention will be understood and appreciated more fully from the following detailed description of embodiments of the invention, taken in conjunction with accompanying drawings of which.

Figure 1:
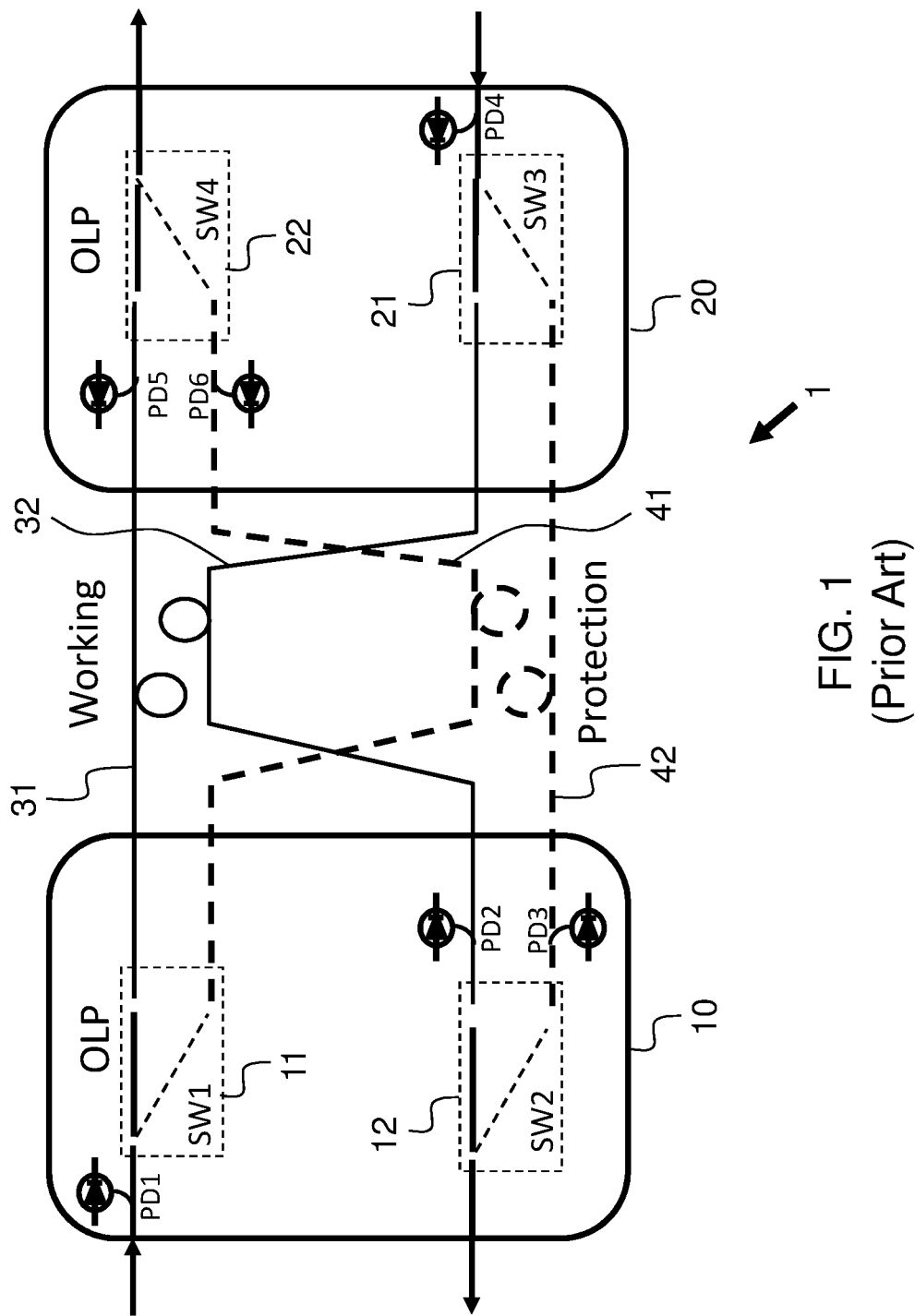
FIG. 1 is a simplified functional block diagram of optical line protection scheme as is known in the art.

It will be appreciated that for simplicity and clarity purpose, elements shown in the drawings have not necessarily been drawn to scale. Further, in various functional block diagrams, two connected devices and/or elements may not necessarily be illustrated to be connected, for example, by a continuous solid line or dashed line but rather sometimes a small gap between two lines extended from the two devices and/or elements may be inserted intentionally in order to illustrate the individual devices and/or elements even though their connection is implied. In some other instances, grouping of certain elements in a functional block diagram may be solely for the purpose of description and may not necessarily imply that they are in a single physical entity or they are embodied in a single physical entity.

DETAILED DESCRIPTION OF PREFERRED EMBODIMENTS

Figure 2:
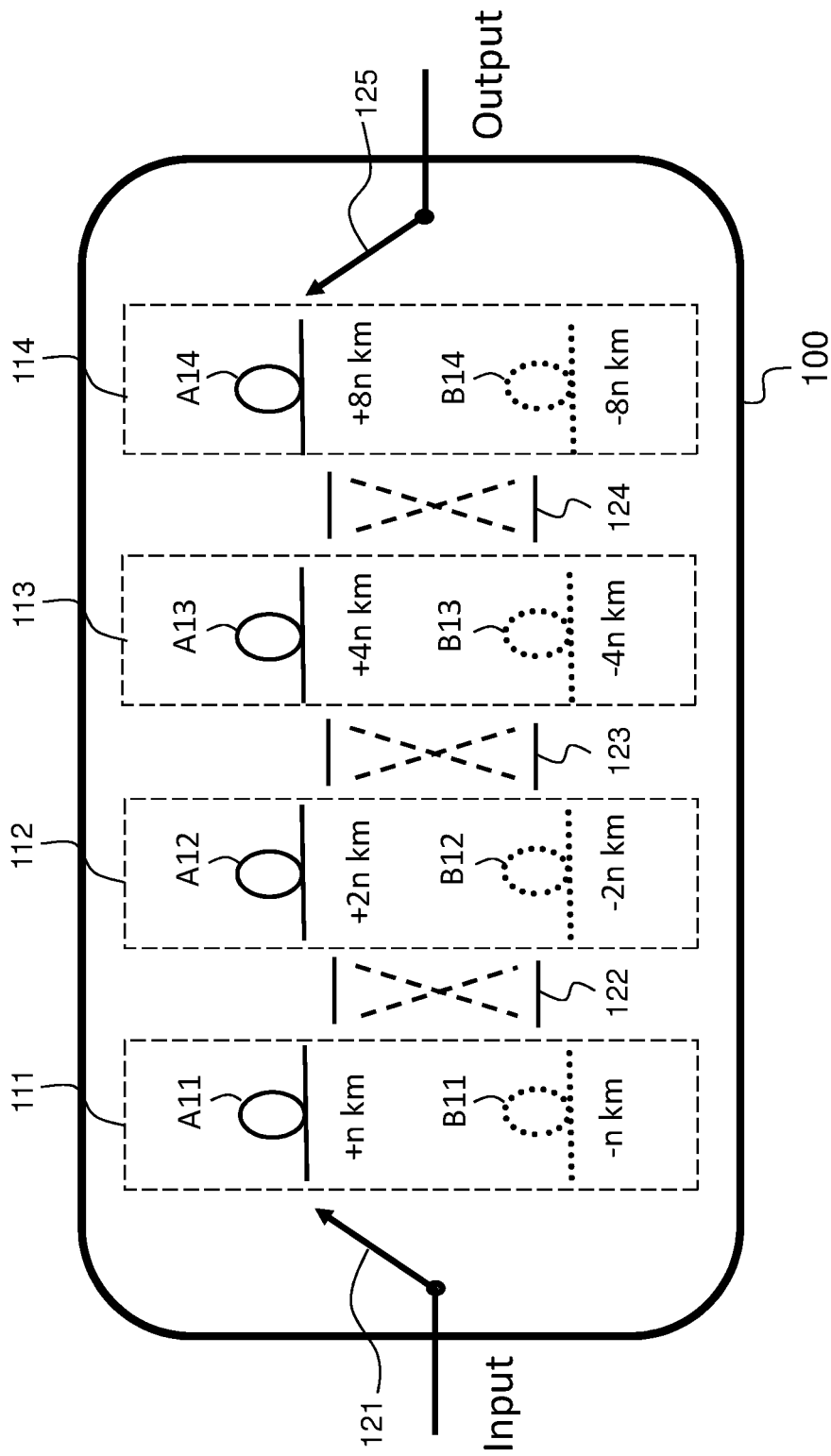
FIG. 2 is a demonstrative illustration of functional block diagram of a transmission-type optical digital dispersion compensation module according to one embodiment of present invention.

FIG. 2 is a demonstrative illustration of functional block diagram of a transmission-type optical digital dispersion compensation module according to an embodiment of present invention. In particular, digital dispersion compensation module (DDCM) 100 may include a plurality of dispersion compensation units that are connected in a series by a set of optical switches. For example, in the embodiment illustrated in FIG. 2, DDCM 100 may start with a first optical switch (OSW) 121; the first OSW 121 is then connected to a first dispersion compensation unit (DCU) 111; the first DCU 111 is then connected to a second OSW 122; the second OSW 122 is then connected to a second DCU 112; the second DCU 112 is then connected to a third OSW 123; the third OSW 123 is then connected to a third DCU 113; the third DCU 113 is then connected to a fourth OSW 124; the fourth OSW 124 is then connected to a fourth DCU 114; and finally the fourth DCU 114 is connected to a fifth OSW 125 to finish DDCM 100. However, a person skilled in the art will appreciate that embodiments of present invention are not limited in the above aspect and DDCM 100 may include more or less OSW's and DCU's that are serially connected as being described above. For example, according to specific requirement for optical signal transportation, including range of dispersion to be compensated and/or the granularity of compensation needed, DDCM 100 may include more DCU's and correspondingly more OSW's.

Optical switches 121 and 125 may be connected to the input and output of DDCM 100 and may be one-by-two (1×2) type optical switches. For example, optical switch 121 may have one input and two outputs and similarly optical switch 125 may have two inputs and one output. According to one embodiment, optical switches 122, 123, and 124 may all be two-by-two (2×2) type optical switches, having two inputs and two outputs respectively, which are configured and electronically controlled to be at either a straight through position (solid lines in FIG. 2) or a cross-over position (dot lines in FIG. 2), as being demonstratively illustrated in FIG. 2. Because optical switches 121, 122, 123, 124, and 125 are all electronically controlled, a short response time of less than 10 ms, which is important for system application, is generally achieved.

Dispersion compensation units 111, 112, 113, and 114 may each be able to provide a base amount, or a certain integer multiple thereof, of dispersion compensation to an input optical signal. The dispersion compensated may be positive or negative, and may be broadband across a wide wavelength range. For example, the wavelength range covered may be from 1260 nm to 1680 nm, preferably from 1510 nm to 1630 nm, and more preferably from 1530 nm to 1565 nm although other wavelength ranges or bands, wider or narrower, are fully contemplated as well. In other words, DCUs 111, 112, 113 and 114 may be able to provide adequate amount of dispersion compensation for dense WDM (DWDM) systems across multiple wavelength bands including, for example, O-band of 1260-1360 nm, E-band of 1360-1460 nm, S-band of 1460-1530 nm, C-band of 1530-1565 nm, L-band of 1565-1625 nm, and/or U-band of 1625-1675 nm.

The base amount of dispersion compensation to be given by DDCM 100 is determined by the granularity of compensation required by its particular system application, which is often affected and/or determined by, among others, the rate of digital optical signal such as whether the digital optical signal to be compensated is a 10 Gb/s or a 40 Gb/s optical signal. Furthermore, assuming DCU 111 is designed to provide a base amount of dispersion compensation (both positive and negative), equivalent in value to a piece of SMF-28 fiber of n km in length, wherein n may be any suitable number, having a dispersion amount of y ps/nm/km at a particular wavelength, DCU 112, 113, and 114 may be designed to provide dispersions equivalent to $2^i \times n$ km of the same SMF-28 fiber where i=1, 2, and 3. As being illustrated in FIG. 2, each DCU has four ports with two input ports, one for positive and one for negative dispersion compensation, and two output ports for the signal to exit the DCU. The four ports are connected respectively to two optical switches, one at the input side and one at the output side.

More specifically, as a particular example illustrated in FIG. 2, DCU 111 may include a positive dispersion element A11 and a negative dispersion element B11; DCU 112 may include a positive dispersion element A12 and a negative dispersion element B12; DCU 113 may include a positive dispersion element A13 and a negative dispersion element B13; and DCU 114 may include a positive dispersion element A14 and a negative dispersion element B14. The dispersion value of elements A11, A12, A13, and A14 may be doubled sequentially, that is, A12 is twice as much as A11; A13 is twice as much as A12; and A14 is twice as much as A13 in the amount of dispersion. Similarly, absolute dispersion value of dispersion element B11, B12, B13, and B14 may be doubled sequentially as well with B14 has eight times dispersion as that of B11. In the meantime, value of dispersion of A11 is the same as value of B11, so is A12 and B12, A13 and B13, and A14 and B14. The dispersion elements A11, A12, A13, A14 and B11, B12, B13 B14 may be constructed from distributed waveguides such as dispersion compensation fiber (DCF), dispersion shifted fiber (DSF), single mode fiber (SMF), fiber-bragg grating (FBG), and/or other discrete resonators such as Etalon-based Fabry-Perot resonator or a ring-resonator, to list a few.

By setting optical switches 122-124 at either the straight through or cross-over position individually, the total equivalent dispersion value that DDCM 100 may be able to provide ranges from −15 n km to +15 n km of SMF-28 fiber with an incremental step of 2 n km. Therefore, when being used in a fiber-optic link of a total dispersion equivalent to a piece of SMF-28 fiber from −16 n km to +16 n km, net dispersion of the fiber-optic link after compensation may be brought down by DDCM 100 to be within +/−n km, which dramatically reduce the required tolerance range of the transmitting and/or receiving devices communicating through the fiber-optic link.

It is to be noted that the above configuration of DDCM 100 may be generalized to include a dispersion compensation module having N dispersion compensation units cascaded by N+1 optical switches, with N being any suitable digital number (for example, N=4 for DDCM 100 illustrated in FIG. 2). Each dispersion compensation unit k (k=1, 2, . . . N) may be able to selectively provide either a positive or a negative dispersion with a value equivalent to $2^{k-1} \times n$ km SMF-28 fiber. The N dispersion compensation units may be cascaded randomly, in an ascending order, or in a descending order in terms of dispersion value provided by each DCU. A total range of dispersion compensation provided by DDCM 100 may be from $-(2^N-1) \times n$ km to $+(2^N-1) \times n$ km, capable of adjusting a fiber-optic link of total dispersion no more than $2^N \times n$ km down to a range of +/−n km. With the incremental and discrete nature of dispersion adjustment, a dispersion compensation module based upon the above scheme of N cascaded dispersion compensation units is referred to herein as a digital dispersion compensation module (DDCM).

The dispersion compensation units (DCUs) illustrated in FIG. 2 each includes a positive dispersion element and a negative dispersion element of a same value. Each dispersion element has one input port and one output port, making up a total two input ports and two output ports of the DCU. An optical signal may enter an input port of one of the two dispersion elements, based upon how the DCU is connected to a connecting optical switch, and exits from a corresponding output port of that dispersion element. DDCM with an optical signal going through an input and an output port of each of the dispersion compensation units, as being described above, may be referred to hereinafter as transmission-type DDCM.

It is to be noted that in the above description, DDCM 100 is illustrated as an example to have four dispersion compensation units cascaded by three 2×2 optical switches with additional two 1×2 optical switches respectively at the input and output port of the DDCM. However, embodiments of present invention are not limited in this aspect. For example, other types of optical switches may be used to replace the 2×2 optical switches in cascading the four dispersion compensation units. More specifically, as an example, two 1×2 optical switches connected back-to-back may be used to replace one 2×2 optical switch in the DDCM configuration shown in FIG. 2. Other optical switches with more than two input and/or output ports may be used as well. Moreover, one or more of the four dispersion compensation units may be described to include some or a portion of the cascading optical switch or switches. All of the above variations are fully contemplated here to be within the spirit of present invention.

Figure 3:
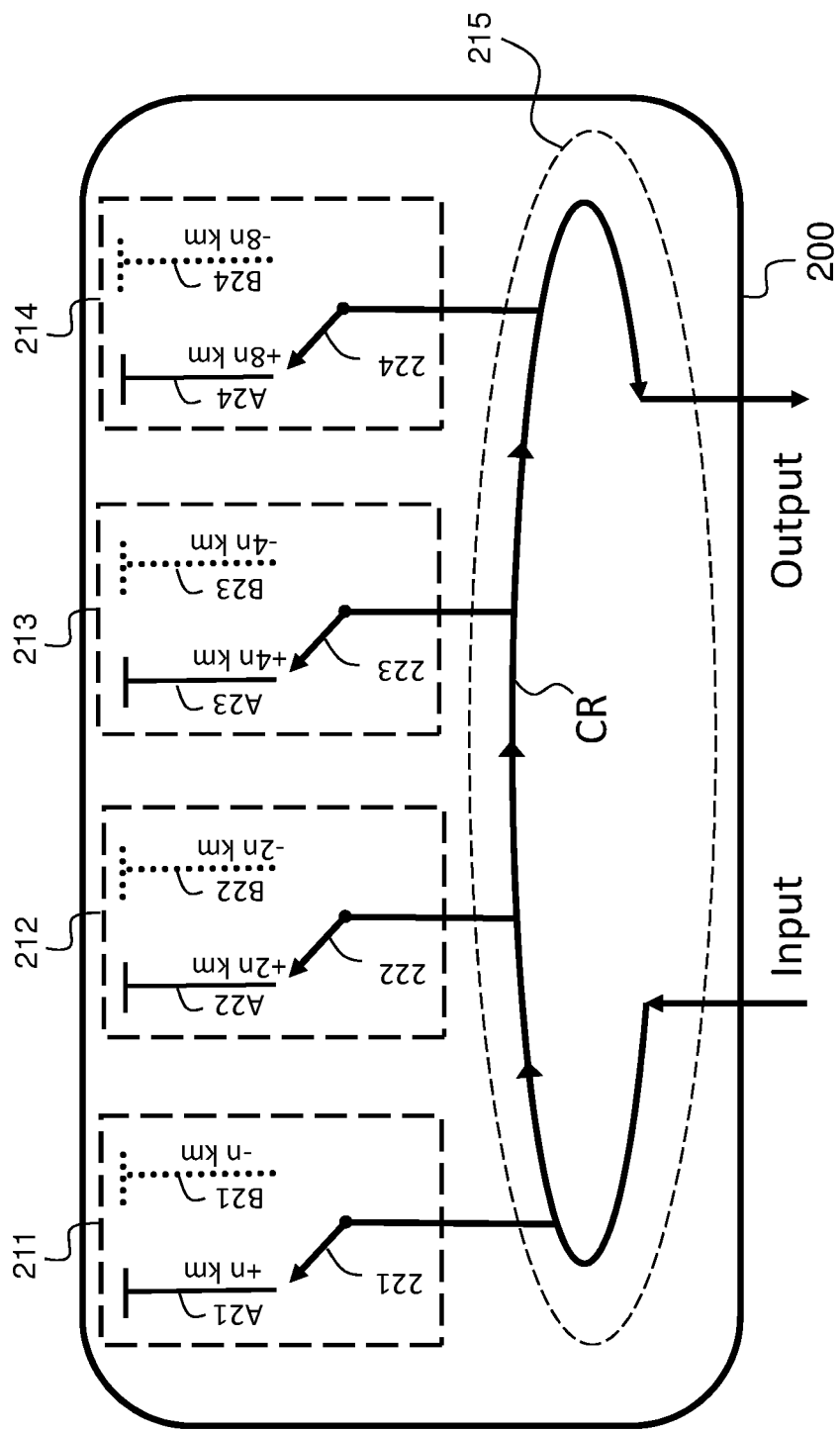
FIG. 3 is a demonstrative illustration of functional block diagram of a reflective-type optical digital dispersion compensation module according to another embodiment of present invention.

FIG. 3 is a demonstrative illustration of functional block diagram of a reflective-type optical digital dispersion compensation module according to another embodiment of present invention. For example, DDCM 200 may include four dispersion compensation units 211, 212, 213, and 214 that are connected to a multi-port optical circulator such as a 6-port optical circulator 215. In one embodiment, the 6-port optical circulator may be constructed from cascaded lower port optical circulators such as two or more 3-port or 4-port optical circulators.

In FIG. 3, dispersion compensation units 211, 212, 213, and 214 may each include a positive dispersion element, a negative dispersion element, and an optical switch being capable of selectively connecting to one of the positive dispersion element and the negative dispersion element. For example, DCU 211 may include a positive dispersion element A21, a negative dispersion element B21, and an optical switch 221 connected to either A21 or B21; DCU 212 may include a positive dispersion element A22, a negative dispersion element B22, and an optical switch 222 connected to either A22 or B22; DCU 213 may include a positive dispersion element A23, a negative dispersion element B23, and an optical switch 223 connected to either A23 or B23; and DCU 214 may include a positive dispersion element A24, a negative dispersion element B24, and an optical switch 224 connected to either A24 or B24. Optical switches 221, 222, 223, and 224 may be, for example, one-by-two (1×2) optical switches which is connected to either the positive dispersion element or the negative dispersion element inside their respective dispersion compensation unit. The optical switches may be electronically controlled such that a fast response time of less than 10 ms may be achieved.

Alternatively, optical switches 221, 222, 223, and 224 may be considered or described as situating outside of DCU 211, 212, 213, and 214 and are used in connecting DCU 211, 212, 213, and 214 to their respective ports of multi-port optical circulator 215, in which case DCU 211, 212, 213, and 214 may be considered as only including one positive dispersion element and one negative dispersion element. It is to be noted that other types of description or categorization of individual elements inside DCMM 200 may be possible and fully contemplated, and all of which are considered here as being within the spirit of present invention. Nevertheless, in the below description, for simplicity of description without losing generality, DCU 211, 212, 213, and 214 are considered to include optical switches 221, 222, 223, and 224, respectively.

In DDCM 200, dispersion elements A21, A22, A23 and A24 are all single-port positive dispersion elements with their dispersion value, except a minimum one, being at least twice as much as another, as being demonstratively illustrated in the block diagram FIG. 3. For example, A22 may have twice as much dispersion as A21; A23 may have twice as much dispersion as A22; and A24 may have twice as much dispersion as A23. Similarly, dispersion elements B21, B22, B23, and B24 are all single port negative dispersion elements as well with their dispersion value, negative in sign, being at least twice as much as another except a minimum one, similar to the relationship among A21, A22, A23, and A24. Preferably, within each dispersion compensation unit, the positive dispersion element and the negative dispersion element have the same amount of dispersion value.

Both the positive and the negative dispersion elements inside a dispersion compensation unit may be constructed from distributed waveguides such as DCF, DSF, or SMF fibers, in which case one end of the DCF, DSF, or SMF fiber may be reflectively terminated such as by an optically coated mirror. The dispersion element may also be constructed from fiber-bragg grating (FBG) or other discrete components including, but not limited to, a Fabry-Perot Etalon-based cavity or a ring-resonator. In the below description, SMF-28 fiber is assumed to be used.

By connecting each of the optical switches 221, 222, 223, and 224 to either the positive or the negative dispersion elements inside their respective dispersion compensation units, the total dispersion value that may be obtained from DDCM 200 varies from equivalent −15 n km to +15 n km of SMF-28 fiber with an incremental step of 2 n km. For any fiber link with a total dispersion within an equivalent range from −16 n km to +16 n km of SMF-28 fiber, the fiber link may be compensated by applying DDCM 200 to have a net dispersion within equivalent of +/−n km of SMF-28 fiber. Similar to DDCM 100 illustrated in FIG. 2, DDCM 200 may be generalized to be a DDCM having N dispersion compensation units connected to a N+2-port optical circulator. Each dispersion compensation unit k (k=1, 2, ... N) may have a dispersion value equivalent to $2^{k-1} \times n$ km SMF-28 fiber, both positive and negative, and the N dispersion compensation units may be connected to optical circulator 215 in the order of k=1, 2, ... N, or in any other random order. A total range of dispersion compensation provided by this DDCM 200 may be from $-(2^N-1) \times n$ km to $+(2^N-1) \times n$ km, within an achievable residual dispersion range of +/−n km. As being described above, both the positive and the negative dispersion elements in DDCM 200 are a single port element. An optical signal may enter into a dispersion element from optical circulator 215 via the optical switch inside the DCU; get reflected back at the other end of the dispersion element to return back to optical circulator 215; propagating to the next port of optical circulator 215; and enter into a dispersion element of the next DCU or exit DCMM 200 through optical circulator 215. The dispersion elements can be constructed through a two-port element by terminating the second port with a reflective mirror. Obviously, its dispersion value is doubled if the signals reflected back by the mirror. DDCM with this type of reflective-type dispersion elements are thus referred to, and hereinafter, as reflective-type DDCM.

Similar to DDCM 100, dispersion compensation units 211, 212, 213, and 214 may each be able to provide a base amount, or a integer multiple thereof, of dispersion compensation to an input optical signal as being described above. The dispersion compensated may be positive or negative, and may be broadband across a wide wavelength range. For example, the wavelength range covered may be from 1260 nm to 1680 nm, preferably from 1510 nm to 1630 nm, and more preferably from 1530 nm to 1565 nm although other wavelength ranges or bands, wider or narrower, are fully contemplated as well. In one embodiment, the wavelength range covered may include O-band of 1260-1360 nm, E-band of 1360-1460 nm, S-band of 1460-1530 nm, C-band of 1530-1565 nm, L-band of 1565-1625 nm, and/or U-band of 1625-1675 nm.

Figure 4:
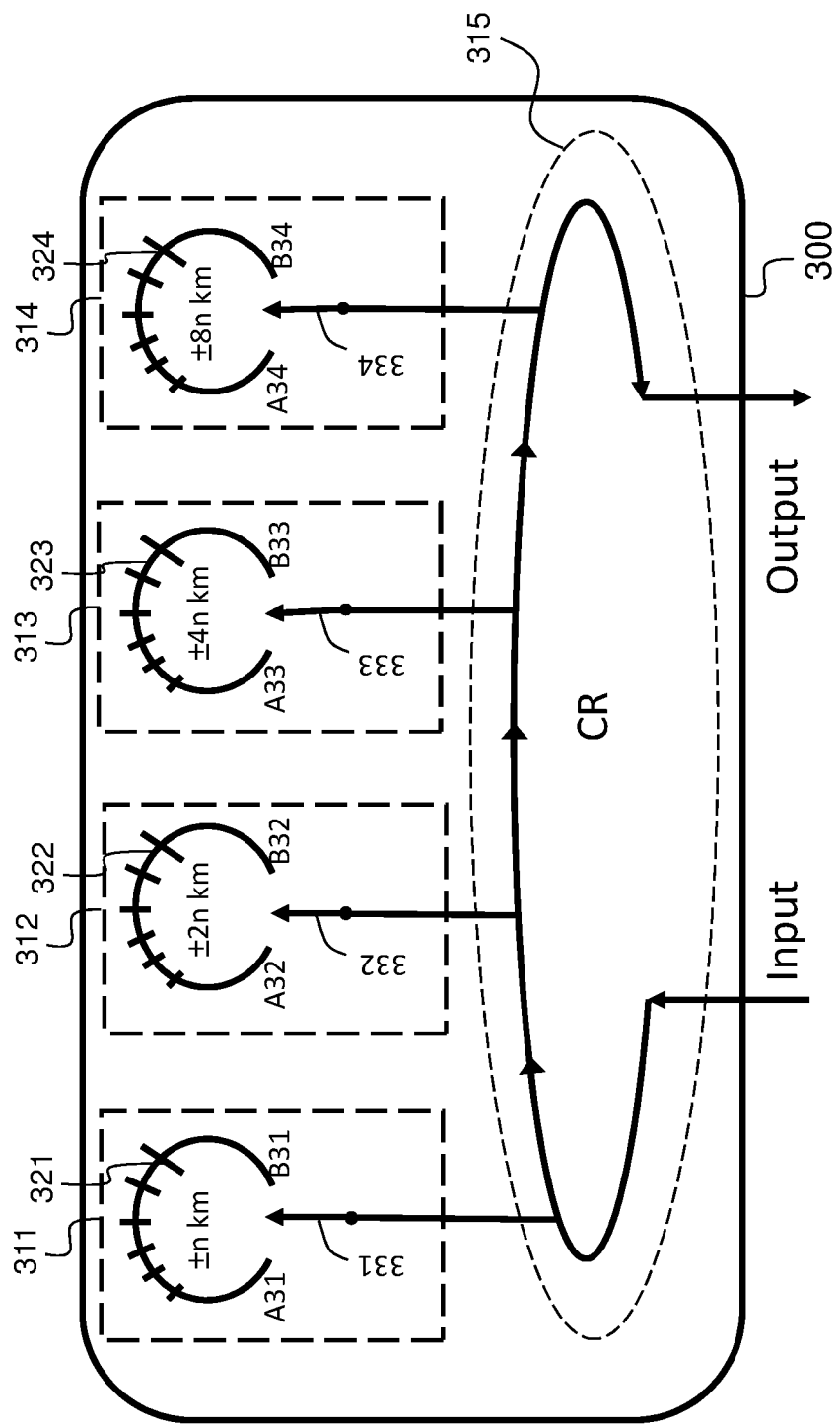
FIG. 4 is a demonstrative illustration of functional block diagram of a reciprocity-type optical digital dispersion compensation module according to yet another embodiment of present invention.

FIG. 4 is a demonstrative illustration of functional block diagram of a reciprocity-type optical digital dispersion compensation module according to yet another embodiment of present invention. More specifically, DDCM 300 illustrated in FIG. 4 may have a configuration similar to that of reflective-type DDCM 200 in that a plurality of dispersion compensation units is connected to a multi-port optical circulator. However, dispersion compensation units 311, 312, 313, and 314 of DDCM 300 are different from that of dispersion compensation units 211, 212, 213, and 214. More specifically, dispersion compensation units 311, 312, 313, and 314 may each contain one dispersion element 321, 322, 323, and 324 respectively, that have two-ports. The two-port dispersion element has reciprocal dispersion characteristics depending on which port an optical signal enters the dispersion element. For example, an optical signal entering into port A3$i$ ($i$=1, 2, 3, and 4) and propagating towards port B3$i$ may get reflected back before reaching port B3$i$ and may experience positive dispersion. Alternately, an optical signal entering into port B3$i$ and propagating towards port A3$i$ may get reflected back before reaching port A3$i$ and may experience negative dispersion. In other words, dispersion element 321, 322, 323, and 324 may serve both as a positive dispersion element and a negative dispersion element depending upon which connection port is used.

According to one embodiment, dispersion element 321, 322, 323, and 324 may be realized or constructed by non-uniform long fiber-bragg grating (FBG) which has continuous operation bandwidth up to 100 nm. DDCM 400, when one or more of its dispersion element 321, 322, 323, and 324 is made of fiber-bragg grating, may be able to not only compensate dispersion over a wide continuous bandwidth within a range from 1260 nm to 1680 nm, but also compensate dispersion profile such as slopes of dispersion, whether linear or non-linear, or even derivative of slope of dispersion. As an enabler for current and/or future super-channel transmission of up to 400 Gb/s or even terabit transmission, dispersion slope compensation may be crucial because in this ultra-high data rate transmission, signal distortion may become critically sensitive to high order dispersions such as slope of dispersion ($2^{nd}$ order dispersion), or even derivative of slope of dispersion ($3^{rd}$ order dispersion).

Optical switches 331, 332, 333, and 334 may be one-by-two (1×2) optical switches and may be used to connect to dispersion elements 321, 322, 323, and 324, respectively and individually, to provide either positive or negative dispersion to an optical signal coming through optical circulator 315 via each optical switches. The optical switches may be electronically controlled such that a fast response time of is less than 10 ms may be achieved.

Figure 5:
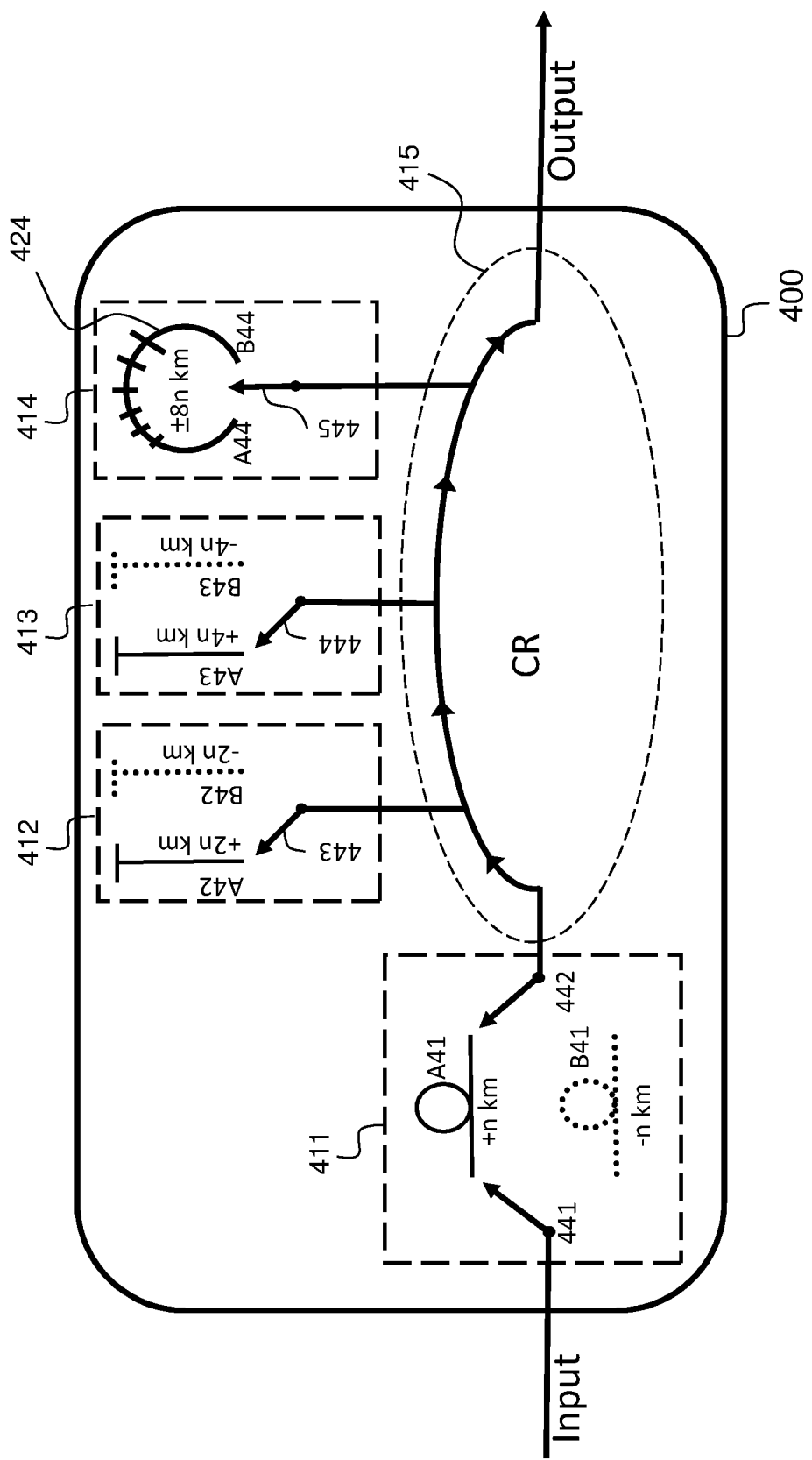
FIG. 5 is a demonstrative illustration of functional block diagram of a hybrid-type optical digital dispersion compensation module according to a further embodiment of present invention.

FIG. 5 is a demonstrative illustration of functional block diagram of a hybrid-type optical digital dispersion compensation module according to a further embodiment of present invention. More specifically, DDCM 400, as being illustrated in FIG. 5, may include one or more dispersion compensation units of various types as those being demonstratively illustrated and described above in connection with DDCM 100 in FIG. 2, DDCM 200 in FIG. 3, and DDCM 300 in FIG. 4. For example, DDCM 400 may include one transmission-type dispersion compensation unit 411 that has a positive and a negative dispersion element, A41 and B41, and two 1×2 optical switches 441 and 442 at an input port and an output port of DCU 411; two reflective-type dispersion compensation units 412 and 413 that have their respective dispersion elements A42, B42 and A43 and B43; and one reciprocity-type dispersion compensation unit that has only one dispersion element made of FBG having two ports A44 and B44.

In the configuration of FIG. 5, dispersion compensation unit 411 is a transmission-type DCU which usually requires a series connection. Because of this, DCU 411 may be connected either to the input port, as being illustrated in FIG. 5, or to the output port of optical circulator 415. Two 1×2 optical switches 441 and 442 may provide proper selection of either the positive dispersion element A41 or the negative dispersion element B41. Dispersion compensation units 412 and 413 may be connected to optical circulator 415 through their respective optical switches 443 and 444, which may select either positive dispersion elements A42 and A43 or negative dispersion elements B42 and B43 independently. Dispersion compensation unit 414 may be connected to optical circulator 415 through optical switch 445. Optical switch 445 may select either port A44 or port B44 to connect to dispersion element 424 to realize or achieve either positive or negative dispersion.

In the block diagram of FIG. 5, DDCM 400 is made from a combination of two or more different types of dispersion compensation units and is hereby referred to as a hybrid-type DDCM. According to another embodiment of present invention, in consideration of insertion loss of the two additional 1×2 optical switches 441 and 442, in some instances transmission-type dispersion compensation unit 411 may be replaced simply by a piece of optical fiber with a proper length of, for example, less than 5 km.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the spirit of the invention.

What is claimed is:

1. A digital dispersion compensation module (DDCM) comprising:
   a multi-port optical circulator; and
   a plurality of dispersion compensation units connected to said multi-port optical circulator,
   wherein at least one of said plurality of dispersion compensation units comprises:
      a fiber-bragg grating (FBG) having a first port and a second port; and
      an optical switch being capable of selectively connecting to one of said first port and said second port of said FBG,
      wherein said at least one of said plurality of dispersion compensation units is adapted to provide a positive dispersion to an optical signal, from said multi-port optical circulator, when said optical switch connects to said first port of said FBG and is adapted to provide a negative dispersion to said optical signal when said optical switch connects to said second port of said FBG.

2. The DDCM of claim 1, wherein each of said plurality of dispersion compensation units is configurable to selectively provide a positive dispersion or a negative dispersion to said optical signal, with value of said negative dispersion being same as value of said positive dispersion.

3. The DDCM of claim 2, wherein at least one of said plurality of dispersion compensation units is a transmission-type dispersion compensation unit having a first port and a second port, one of said first port and said second port of said transmission-type dispersion compensation unit being an input port or an output port of said DDCM.

4. The DDCM of claim 2, wherein at least one of said plurality of dispersion compensation units is a reflective-type dispersion compensation unit having a positive dispersion element, a negative dispersion element, and an optical switch being configurable to selectively connect to either said positive or said negative dispersion element, said positive and negative dispersion element being dispersion fibers with both reflectively terminated at one end thereof.

5. The DDCM of claim 1, wherein said FBG is capable of selectively providing said positive or said negative dispersion to said optical signal over a continuous bandwidth of at least 35 nm in either a C-band of 1530-1565 nm or a L-band of 1565-1625 nm of optical signal spectrum.

6. The DDCM of claim 1, wherein said FBG is adapted to provide a non-zero second-order dispersion value to said optical signal, said second-order dispersion being a derivative of said positive dispersion or said negative dispersion.

7. A digital dispersion compensation module (DDCM) comprising:
   a multi-port optical circulator; and
   a plurality of dispersion compensation units connected to said multi-port optical circulator,
   wherein at least one of said plurality of dispersion compensation units is a transmission-type dispersion compensation unit (DCU) having a first and a second port, a reflective-type DCU having two reflectively terminated dispersion elements, or a reciprocity-type DCU having a fiber-bragg grating (FBG); and is capable of selectively providing, through use of an optical switch, a positive or a negative dispersion to an optical signal going through said multi-port optical circulator.

8. The DDCM of claim 7, wherein said at least one of said plurality of dispersion compensation units is said reciprocity-type DCU, said reciprocity-type DCU comprises:
   said FBG having a first port and a second port; and
   said optical switch being capable of selectively connecting to said first port or said second port of said FBG to provide said positive or said negative dispersion respectively.

9. The DDCM of claim 8, wherein said FBG is capable of selectively providing said positive or negative dispersion to said optical signal over a continuous bandwidth of at least 35 nm either in a C-band of 1530-1565 nm or in a L-band of 1565-1625 nm of optical signal spectrum.

10. The DDCM of claim 7, wherein each of said plurality of dispersion compensation units is configurable to selectively provide a positive or a negative dispersion to said optical signal, with value of said negative dispersion being same as value of said positive dispersion.

11. The DDCM of claim 7, wherein said at least one of said plurality of dispersion compensation units is said transmission-type DCU having said first port and said second port, wherein one of said first port and said second port being an input port or an output port of said DDCM.

12. The DDCM of claim 7, wherein said at least one of said plurality of dispersion compensation units is said reflective-type DCU, said reflective-type DCU comprises:
   a first piece of fiber of positive dispersion, being one of said two reflectively terminated dispersion elements, having a first end and a second end with said second end reflectively terminated;
   a second piece of fiber of negative dispersion, being another one of said two reflectively terminated dispersion elements, having a first end and a second end with said second end reflectively terminated; and
   said optical switch being configurably connected to one of said first piece of fiber and said second piece of fiber providing said positive or said negative dispersion respectively.

13. A digital dispersion compensation module (DDCM) comprising a multi-port optical circulator and a plurality of dispersion compensation units (DCUs) cascaded along a path of an optical signal, the plurality of dispersion compensation units being connected to said multi-port optical circulator, each of said plurality of dispersion compensation units being configurable to selectively provide a positive or a negative dispersion, through one or more optical switches, from said multi-port optical circulator to said optical signal.

14. The DDCM of claim 13, wherein at least one of said plurality of dispersion compensation units is a reciprocity-type DCU comprising:
   a fiber-bragg grating (FBG) having a first port and a second port; and
   an optical switch being capable of selectively connecting to said first port or said second port of said FBG to provide said positive or said negative dispersion respectively.

15. The DDCM of claim 13, wherein at least one of said plurality of dispersion compensation units is a transmission-type DCU having an input port and an output port, one of said input port and said output port of said transmission-type DCU being an input port or an output port of said DDCM.

16. The DDCM of claim 13, wherein said plurality of dispersion compensation units is cascaded either by a multi-port optical circulator or by a plurality of two-by-two (2×2) optical switches.

* * * * *